United States Patent [19]

Dopp et al.

[11] Patent Number: 5,733,676
[45] Date of Patent: Mar. 31, 1998

[54] METAL-AIR CATHODE CAN AND ELECTROCHEMICAL CELL MADE THEREWITH

[75] Inventors: Robert B. Dopp, Madison; John Edward Oltman, Mount Horeb, both of Wis.

[73] Assignee: Rayovac Corporation, Madison, Wis.

[21] Appl. No.: 435,477

[22] Filed: May 5, 1995

[51] Int. Cl.$^6$ ................................................ H01M 12/06
[52] U.S. Cl. ........................................ 429/27; 429/87
[58] Field of Search ................................ 429/27, 82, 87

[56] References Cited

U.S. PATENT DOCUMENTS

| Re. 31,413 | 10/1983 | Jaggard | 429/27 |
|---|---|---|---|
| 3,352,769 | 11/1967 | Ruben | 204/143 |
| 3,372,060 | 3/1968 | Platner | 136/86 |
| 3,746,580 | 7/1973 | Aker et al. | 136/86 |
| 3,801,375 | 4/1974 | Jaggard . | |
| 3,902,922 | 9/1975 | Kalnoki-Kis | 429/82 |
| 3,963,519 | 6/1976 | Louie . | |
| 4,118,544 | 10/1978 | Przybyla et al. | 429/27 |
| 4,209,574 | 6/1980 | Reutschi | 429/133 |
| 4,254,593 | 3/1981 | Paulfeuerbom | 51/425 |
| 4,262,062 | 4/1981 | Zatsky | 429/27 |
| 4,343,869 | 8/1982 | Oltman et al. | 429/27 |
| 4,369,568 | 1/1983 | Dopp | 29/623.21 |
| 4,591,539 | 5/1986 | Oltman et al. | 429/27 |
| 4,649,090 | 3/1987 | Oltman et al. | 429/29 |
| 4,687,714 | 8/1987 | Oltman et al. | 429/27 |
| 4,791,034 | 12/1988 | Dopp | 429/27 |
| 4,822,698 | 4/1989 | Jackoritz | 429/27 |
| 5,069,986 | 12/1991 | Dworkin et al. | 429/27 |
| 5,093,212 | 3/1992 | Lloyd et al. | 429/2 |
| 5,308,711 | 5/1994 | Passaniti et al. | 429/29 |
| 5,328,777 | 7/1994 | Bentz et al. | 429/27 |
| 5,451,473 | 9/1995 | Oltman et al. | 429/27 |

OTHER PUBLICATIONS

"High-Capacity Zinc-Air Battery Series for Hearing Aids" by Naoka Soma and Yoshinobu Morita published in National Technical Report, vol. 40, No. 4, Aug. 1994, pp. 18–23.

Primary Examiner—Stephen Kalafut
Attorney, Agent, or Firm—Thomas D. Wilhelm; Brian R. Tumm

[57] ABSTRACT

This invention pertains to metal-air electrochemical cells wherein one or more air entry ports is located in the bottom of the cathode can, to provide for entry of oxygen-rich air into the cathode can, where the oxygen participates in the chemical reaction whereby the cell produces electrical energy. In this invention, multiple small air entry ports are provided. Generally, the use of multiple ports distributed over the bottom of the cathode can, opposite the reaction surface of the cathode assembly, while not increasing the overall open area of the ports, results in an increase in the ratio of the cell limiting current to the rate at which moisture is lost from the cell. Accordingly, moisture loss as a function of electrical energy produced, is less.

62 Claims, 6 Drawing Sheets

METAL-AIR CATHODE CAN AND ELECTROCHEMICAL CELL MADE THEREWITH

FIELD OF THE INVENTION

This invention relates to alkaline electrochemical cells having metallic anodes and air cathodes, commonly known as metal-air cells. More particularly, this invention relates to the structure of the cathode cans, and to the use of small air ports on the bottom of the cathode cans. The air ports have specifically limited open area to provide ingress of air containing cathodic oxygen, while restricting water vapor movement.

BACKGROUND OF THE INVENTION

The growth in use of small electrically-powered devices has increased the demand for very small metal-air electrochemical cells. Such small cells are usually disc-like or pellet-like in appearance, and are about the size of garment buttons. These cells generally have diameters ranging from less than 0.25 inch up to about 1.0 inch, and height ranging from less than 0.15 inch up to about 0.60 inch. The small size and the limited amount of electrochemically reactive material contained in these small metal-air cells result in considerable attention being directed to improving the efficiency and completeness of the power generating electrochemical reactions which occur therein.

Metal-air cells convert atmospheric oxygen to hydroxyl ions in the air cathode. The hydroxyl ions then migrate to the anode, where they cause the metal contained in the anode to oxidize. Usually the active anode material in such cells comprises zinc.

More particularly, the desired reaction in a metal-air cell air cathode involves the reduction of oxygen, the consumption of electrons, and the production of hydroxyl ions, the hydroxyl ions being able to migrate through the electrolyte toward the anode, where oxidation of zinc may occur, forming zinc oxide, and liberating electrons In most metal-air cells, air enters the cell through a port extending through the bottom of the cathode can. The port extends through the bottom of the cathode can, and may be immediately adjacent the cathode assembly, or may be separated from the cathode assembly by an air chamber or an air diffusion member.

In any of such arrangements, the port facilitates the movement of air through the port and into the cathode assembly. At the cathode assembly, the oxygen in the air reacts with water at the cathode assembly as a chemically reactive participant in the electrochemical reaction of the cell, and thereby forms hydroxyl ions.

In normal operation, the reaction surface of the cathode assembly is laden with electrolyte, water being a major constituent of the electrolyte. Accordingly, the water at the reaction surface of the cathode assembly has a vapor pressure, and is subject to evaporation at the reaction surface. To the extent water does evaporate at the reaction surface, moisture content of the cell is reduced, along with a corresponding reduction in efficiency of the cell. Where moisture loss is excessive, the cell may fail before the electrochemical reaction materials have been chemically used up.

A second, and undesirable function facilitated by the port in the bottom of the cathode can is that moisture e.g. evaporated from the reaction surface of the cathode assembly can escape from the cell through the port, whereby the cell dries out, and correspondingly loses effectiveness. Thus, there is a relationship between the amount of oxygen that can be made available to the cell through conventional port configurations, and the amount of moisture loss associated with such port configurations.

It is an object of this invention to provide improved cathode can structure for a metal-air electrochemical cell, the cathode can having one or more air entry ports so structured and configured, both individually and relative to each other, that the port configuration provides an improved relationship between the amount of oxygen that is available to the cathode assembly and the amount of moisture lost from the cell through the port configuration.

It is another object to provide improved cathode can structure for a metal-air electrochemical cell, wherein the sum of the open area of the port configuration is reduced while maintaining the cell limiting current.

It is still another object to provide improved cathode can structure for a metal-air electrochemical cell, the cathode can having a plurality of ports, with the port configuration structured so that, in a metal-air cell made with the cathode can, oxygen is more uniformly distributed over the cathode assembly, while minimizing the combined open area of the ports through the cathode can, and thereby reducing the amount of moisture loss through the ports.

A further object is to provide improved metal-air electrochemical cells having an increase in the ratio of the limiting current of the cell to the combined area of gaseous ingress and egress available through the port configuration.

SUMMARY OF THE DISCLOSURE

Some of the objects are obtained in a first family of embodiments comprehending electrochemical cell apparatus including a cathode can for use in a metal-air electrochemical cell having an anode comprising metal, the cathode can having an outside diameter, and comprising a bottom, having an inner surface, an outer surface, and an average thickness between the inner surface and the outer surface; and a side wall extending upwardly from the bottom, the bottom having at least one port extending therethrough, between the inner surface and the outer surface, and defining an opening in the bottom, the port having a maximum dimension across the opening defined by the port, the maximum dimension being smaller than the average thickness of the bottom, preferably no greater than 90% of the average thickness of the bottom.

In preferred embodiments, the cathode can includes at least two ports, each having a maximum dimension smaller than the thickness of the bottom, the ports preferably being substantially evenly spaced with respect to each other.

Preferably, the electrochemical cell apparatus includes a cathode assembly in the cathode can, the cathode assembly being spaced from the bottom and having a reaction surface facing the bottom, and thereby defining a reservoir between the bottom and the cathode assembly. The reaction surface of the cathode assembly defines an effective reaction area, and gas entering the reservoir through the ports and traversing across the reservoir to the reaction surface expands somewhat as a plume from each port during such traverse, an outline of each such plume being represented by an imaginary closed figure on the reaction surface aligned with each respective port, the imaginary closed figures, when expanded uniformly to touch each other, but generally not overlap each other, representing a footprint on the cathode assembly corresponding with the spacing of the ports on the bottom, the spacing of the ports being such that the footprint covers at least 80% of the effective reaction area of the reaction surface of the cathode assembly.

It is preferred that each port comprise a substantially circular opening, such that the maximum dimension of each port comprises a diameter of the respective port, the ratio of the average of the diameters of the ports, to the outside diameter of the cathode can being no greater than 0.025/1, preferably no greater than 0.020/1, and more preferably 0.017/1 or less.

It is also preferred that each port have an area enclosed thereby, and that the ratio of the average of the enclosed areas of the ports, to the area of the electrochemical cell apparatus, as defined by the outside diameter of the cathode can, be no greater than 0.001/1, preferably no greater than 0.00075/1, and more preferably no greater than 0.0005/1.

A preferred feature of electrochemical cells made using the invention is that the ratio of the limiting current of the electrochemical cell, in milliamps, to the effective reaction area of the reaction surface in millimeters squared be at least 100/1, preferably at least 125/1, more preferably at least 150/1, and most preferably at least 220/1.

The advantages of the invention become more apparent as the diameter of the port, or ports, is reduced. Accordingly, it is desired that the diameter of the port be less than 0.010 inch, preferably less than 0.008 inch, more preferably less than 0.0065 inch, still more preferably less than 0.005 inch, and in some cases as little as 0.003 inch, or less.

Another feature of the invention is that, in preferred electrochemical cells made using the invention, given a relative humidity outside the cell differing from the steady state relative humidity at the reaction surface of the cathode assembly by at least 30 relative humidity percent, the cell retains 95% of its mA-hr. capacity over a 30 day period.

Further objects are obtained in a second set of embodiments comprehending a cathode can for use in a metal-air electrochemical cell, the cathode can having an outside diameter, and comprising a bottom, having an inner surface and an outer surface; a side wall extending upwardly from the bottom; and at least five ports extending through the bottom, between the inner surface and the outer surface, and defining corresponding openings in the bottom, the ports preferably being substantially evenly spaced with respect to each other. Average diameter of the ports is preferably no more than about 90% of the average thickness of the bottom.

Preferably, an electrochemical cell made with a cathode can as above includes a cathode assembly in the cathode can, the cathode assembly being spaced from the bottom and having a reaction surface facing the bottom, and thereby defining a reservoir between the bottom and the cathode assembly, the reaction surface of the cathode assembly defining an effective reaction area thereon, gas entering the reservoir through the ports, and traversing across the reservoir to the reaction surface, expanding from each port during such traverse, respective wide angle conical regions correspond to the respective ports, being represented by outlines of imaginary closed figures on the reaction surface aligned with respective ports, the imaginary closed figures, when expanded uniformly to touch each other, but generally not overlap each other, representing a footprint on the cathode assembly corresponding with the spacing of the ports on the bottom, the spacing of the ports being such that the footprint covers at least 80% of the effective reaction area of the cathode assembly.

It is preferred that each port comprise a substantially circular opening, such that the maximum dimension of each port comprises a diameter of the respective port, the ratio of the average of the diameters of the ports, to the outside diameter of the cathode can being no greater than 0.025/1, preferably no greater than 0.020/1, and more preferably 0.017/1, or less.

It is also preferred that each port have an area enclosed thereby, and that the ratio of the average of the enclosed areas of the ports, to the area of the cathode can, as defined by the outside diameter of the cathode can, be no greater than 0.001/1, preferably no greater than 0.00075/1, and more preferably no greater than 0.0005/1.

In an electrochemical cell made with a cathode can as above, and including a cathode assembly in the cathode can, the cathode assembly having a reaction surface facing the bottom, the reaction surface defining an effective reaction area thereon, the ratio of the limiting current of the electrochemical cell in milliamps, to the effective reaction area of the reaction surface in millimeters squared, is desirably at least 100/1, preferably at least 125/1, more preferably at least 150/1, and most preferably at least 220/1.

The advantages of the cathode can of the invention become more apparent as the diameters of the ports are reduced. Accordingly, it is desired that the diameter of each port be less than 0.010 inch, preferably less than 0.008 inch, more preferably less than 0.0065 inch, still more preferably less than 0.005 inch, and in some cases less than 0.003 inch.

With the small sizes of the ports, and the increased number of ports, air can pass into the cathode can in sufficient quantity to provide adequate cathodic oxygen to support normal operation of an electrochemical cell made with a cathode can of the invention, while limiting the passage of moisture into the cell sufficiently that, given a relative humidity outside the cell differing from the steady state relative humidity at the reaction surface of the cathode assembly in the cell, by at least 30 relative humidity percent, the time required to reduce the difference in relative humidity by 95% is greater than 30 days.

A third family of embodiments of the invention is comprehended in a cathode can for use in a metal-air electrochemical cell, the cathode can comprising a bottom, having an inner surface, an outer surface, and a thickness between the inner surface and the outer surface; a side wall circumscribing the bottom, extending upwardly from the bottom and defining an outer circumference of the cathode can, and an overall projected area of the cathode can enclosed thereby within the outer circumference; and at least two ports through the bottom, each port defining an area enclosed thereby, the ratio of the average of the areas of the ports to the overall area of the cathode can, based on the projected area being no greater than 0.001/1, preferably no greater than 0.00075/1, most preferably no greater than 0.0005/1.

Preferably, an electrochemical cell made with a cathode can as described immediately above, includes a cathode assembly in the cathode can, the cathode assembly being spaced from the bottom and having a reaction surface facing the bottom, and thereby defining a reservoir between the bottom and the cathode assembly, the reaction surface of the cathode assembly defining an effective reaction area thereon, gas entering the reservoir through the ports and traversing across the reservoir to the reaction surface expanding from each port during such traverse, respective wide angle conical regions correspond to the respective ports, the wide angle conical regions being represented by outlines of imaginary closed figures on the reaction surface aligned with respective ports, the imaginary closed figures, when expanded uniformly to touch each other, but generally not overlap each other, representing a footprint on the cathode assembly corresponding with the spacing of the ports on the bottom, the spacing of the ports being such that the footprint covers at least 80% of the effective reaction area of the cathode assembly.

It is preferred that each port comprise a substantially circular opening, such that the maximum dimension of each port comprises a diameter of the respective port, the ratio of the average of the diameters of the ports, to the outside diameter of the cathode can be no greater than 0.025/1, preferably no greater than 0.020/1, and more preferably 0.017/1, or less.

A preferred property of cathode cans of the invention is observed in electrochemical cells made with the cathode cans wherein the ratio of the limiting current of the electrochemical cell in milliamps, to the effective reaction area of the reaction surface in millimeters squared is at least 100/1, preferably at least 125/1, more preferably at least 150/1, most preferably at least 220/1.

In cathode cans of this third family of embodiments, it is preferred that the average of the diameters of the ports be less than 0.010 inch, preferably less than 0.008 inch, more preferably less than 0.0065 inch, still more preferably less than 0.005 inch, and in some cases as small as 0.003 inch, or less.

As in the previous families of embodiments, it is preferred here that, in an electrochemical cell made with a cathode can as described immediately above, and including a cathode assembly in the cathode can, the cathode assembly comprising a reaction surface facing the bottom of the cathode can, and an anode including an anode can, reactive anode material and an electrolyte, the electrolyte having a steady state relative humidity at the reaction surface, and wherein, given a relative humidity outside the cell differing from the steady state relative humidity at the reaction surface of the cathode assembly by at least 30 relative humidity percent, the time required to reduce the difference in relative humidity by 95% is greater than 30 days.

A fourth family of embodiments of the invention is comprehended in a cathode can for use in a metal-air electrochemical cell, the cathode can comprising a bottom, having an inner surface, an outer surface, and a thickness between the inner surface and the outer surface; a side wall circumscribing the bottom, and extending upwardly from the bottom and defining a diameter of the cathode can, and thus the diameter of a cathode made with the cathode can; and at least two ports through the bottom, each port having a diameter, the ratio of the average of the diameters of the ports to the diameter of the cathode being no greater than 0.025/1, preferably no greater than 0.020/1, more preferably no greater than 0.017/1.

A fifth family of embodiments is comprehended in a cathode can for use in a metal-air electrochemical cell, and an electrochemical cell made therewith, the cathode can comprising a bottom having an inner surface, an outer surface, and a thickness between the inner surface and the outer surface; a side wall circumscribing the bottom, and extending upwardly from the bottom, the side wall defining an overall diameter of the cathode can, of at least 0.25 inch; and at least three ports through the bottom of the cathode can, each port extending from the outer surface to the inner surface, and across the thickness therebetween.

In some embodiments, there may be four ports, five ports, six ports, or even more. The number of ports is preferably greater than three where the overall diameter of the cathode can is greater than e.g. at least 0.30 inch, or even at least 0.4 inch, or more.

It is preferred that the average diameter of the ports be no more than about 0.0067 inch, preferably no more than about 0.005 inch.

In a sixth family of embodiments, the invention comprehends an electrochemical metal-air cell, comprising an anode; a cathode, including a cathode can, the cathode can having an outside diameter, and further including a bottom, the bottom having an inner surface, an outer surface, and a thickness between the inner surface and the outer surface, and at least two ports extending through the bottom, between the inner surface and the outer surface, each port having an area enclosed thereby; and a seal between the anode and the cathode, the ratio of the limiting current of the cell in milliamps, to the sum of the areas of the ports in millimeters squared being at least 210/1, preferably at least 220/1, more preferably at least 310/1, most preferably at least 250/1.

In a seventh family of embodiments, the invention comprehends an electrochemical metal-air cell, comprising an anode; a cathode, including a cathode can, the cathode can having an outside diameter, and further including a bottom, the bottom having an inner surface, an outer surface, and a thickness between the inner surface and the outer surface, and at least two ports extending through the bottom, between the inner surface and the outer surface, each port having an area enclosed thereby; and a seal between the anode and the cathode, the electrochemical cell having a limiting current of at least 7.5 milliamps, preferably at least 8 milliamps, the ratio of the limiting current of the cell in milliamps to the sum of the areas of the ports in millimeters squared being at least 100/1, preferably at least 100/1, more preferably at least 120/1, still more preferably at least 130/1, yet more preferably at least 150/1, and most preferably at least 170/1.

In an eighth family of embodiments, the invention comprehends an electrochemical metal-air cell, comprising an anode; a cathode, including a cathode can, the cathode can having an outside diameter, and further including a bottom, the bottom having an inner surface, an outer surface, and at least one port extending through the bottom, between the inner surface and the outer surface, the at least one port having a diameter of no more than 0.0067 inch; and a seal between the anode and the cathode.

In certain embodiments, the at least one port has a diameter of no more than 0.005 inch, or no more than 0.003 inch.

Certain embodiments comprehend electrochemical cells having at least two ports, the average of the diameters of the ports being no more than 0.009 inch, preferably no more than 0.007 inch, more preferably no more than 0.005 inch, in some cases no more than 0.003 inch.

Some embodiments comprehend electrochemical cells having at least three ports wherein each port has an average diameter of no more than 0.015 inch, preferably no more than 0.010 inch, more preferably no more than 0.007 inch, still more preferably no more than 0.005 inch, in some cases no more than 0.003 inch.

In a ninth family of embodiments, the invention comprehends an electrochemical metal-air cell, comprising an anode; a cathode, including a cathode can, the cathode can having an outside diameter, and further including a bottom, the bottom having an inner surface, an outer surface, and a thickness between the inner surface and the outer surface, and at least one port extending through the bottom, between the inner surface and the outer surface, the at least one port having a diameter of about 0.001 inch to no more than about 0.0067 inch; and a seal between the anode and the cathode.

The at least one port has a diameter preferably of between about 0.002 inch and about 0.006 inch, more preferably between about 0.003 inch and about 0.005 inch.

DETAILED DESCRIPTION OF THE ILLUSTRATED EMBODIMENTS

Figure 1:
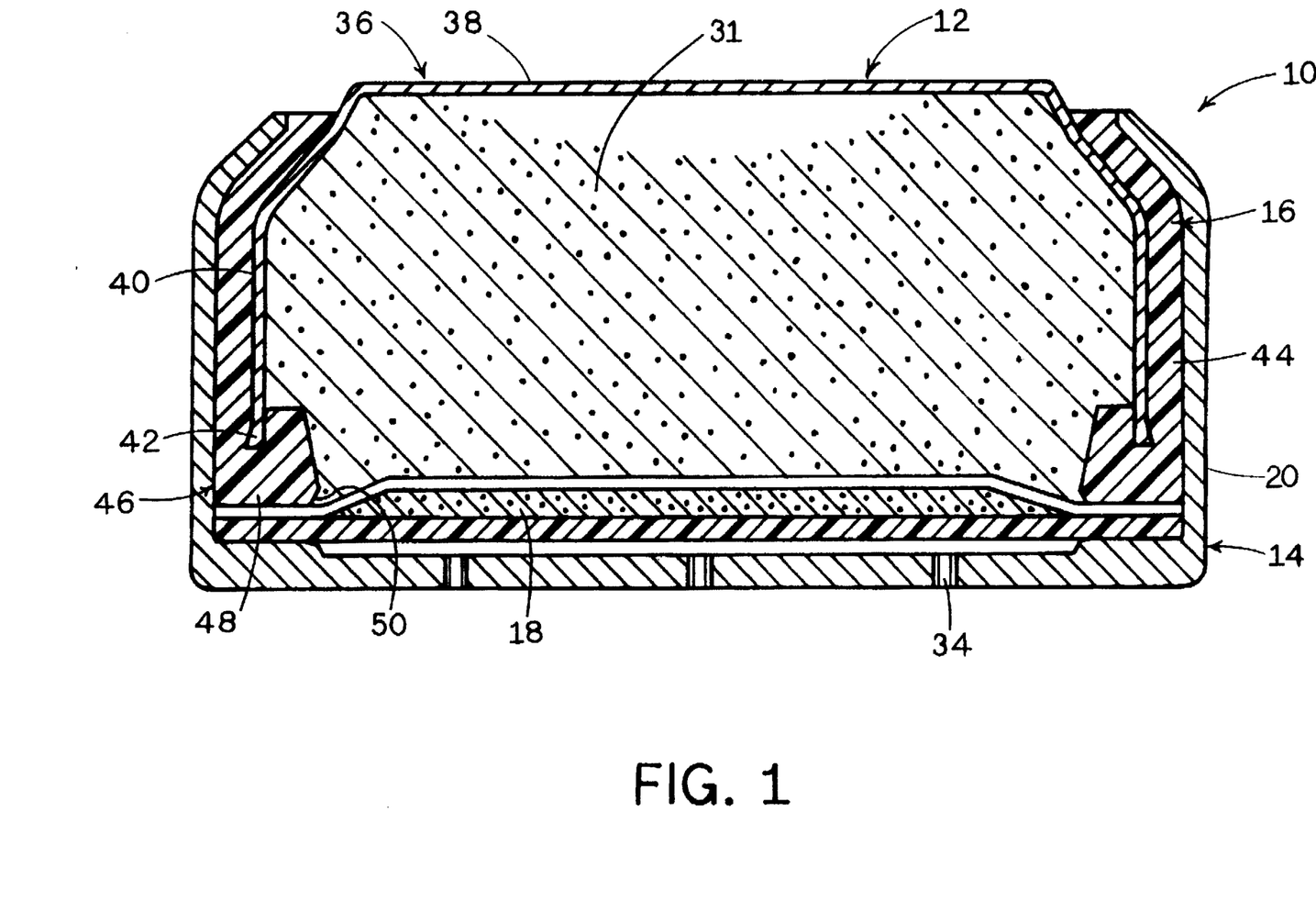
FIG. 1 shows a cross-section of a typical metal-air electrochemical cell of the invention.

Referring now by characters of reference to the drawings, FIG. 1 generally represents a cross-section of a metal-air cell 10, preferably a zinc-air cell, of the present invention. The negative electrode 12, also referred to as the anode 12, is electrically insulated from the positive electrode 14, also referred to as the cathode, by a seal 16, typically made from nylon or similar material.

Cathode 14 includes a cathode assembly 18, contained within cathode can 20. Cathode can 20 has a bottom 22, and circumferential upstanding side wall 24 extending upwardly from the bottom. The cathode assembly 18 includes a current collector and catalytic carbon or similar material. A barrier layer, typically polypropylene, spaces the reactive anode material 31 from the remainder of the cathode assembly. An air diffusion layer, typically polytetrafluoroethylene (PTFE), is disposed on the surface of the cathode assembly adjacent the inner surface 28 of the bottom 22 of the cathode can, and generally fills air reservoir 52.

The inner and outer surfaces 30, 32 respectively of side wall 24 of the cathode can extend about the circumference of the cathode can, defining side wall 24 between them.

Bottom 22 of the cathode can typically has an outer surface 26, an inner surface 28, and a thickness "T" between the inner surface 28 and the outer surface 26.

Ports 34 extend through the bottom 22 of the can, between the outside surface 26 and the inside surface 28.

The anode includes an anode can 36, which includes a top 38, and side wall 40 depending downwardly from the top 38, to a foot 42 at the bottom of side wall 40.

Seal 16 has a side wall 44 extending about the inner perimeter of the cell 10, between the outer surface of side wall 40 of the anode can and the inner surface 30 of side wall 24 of the cathode can, and downwardly to a lower end 46 of the seal, near the inner surface 28 of the bottom 22 of the cathode can.

At the lower end 46 of the seal, a grommet 48 of seal 16 extends inwardly from the inner surface 30 of the side wall 24 of the cathode can, and under the foot 42 of side wall 40 of the anode can. Thus, the grommet 48 of the seal 16 is interposed between the foot 42 of side wall 40 of the anode and the inner surface 28 of the bottom 22 of the cathode can.

Grommet 48 extends about the entire inner perimeter of the cell 10, adjacent cathode assembly 18, defining the active area of the cathode assembly inside the inner edge 50 of grommet 48.

While grommet 48 of seal 16 provides a desirable sealing function, the grommet 48 generally blocks off, from participation in the electrochemical reaction, that area of the cathode assembly 18 which is disposed between grommet 48 and the inner surface 28 of the bottom 22 of the cathode can. Accordingly, only that portion of the cathode assembly 18 which is inside the inner edge 50 of the grommet 48 is available to participate in the electrochemical reaction of the cell, and is referred to herein as the cathode reaction surface 54. The cathode reaction surface, of course, has a mathematically defined area which is referred to herein as the reaction area.

It is well known that the reaction surface of the cathode assembly must have access to oxygen from the air surrounding the cell in order for a metal-air cell to operate as intended. Accordingly, all metal-air cells have an air entry port 34 which allows air to enter the cell. Correspondingly, since the air is only 20% oxygen, and since oxygen is the only major component of the air consumed by the cell, the air inside the cell, in air reservoir 52 is continuously replenished by oxygen-laden air from outside the cell whenever the cell is in operation. Thus, the air entry port can function as both an entry port and an exit port.

As oxygen is consumed at the reaction surface of the cathode assembly 18, an oxygen partial pressure gradient is set up in the air reservoir 52. The partial pressure of oxygen is thus relatively lower adjacent the reaction surface, and is relatively higher further away from the reaction surface. This partial pressure gradient sets up a gradient-driven diffusion of oxygen toward the reaction surface, and corresponding ingress of at least oxygen at the port 34.

Figure 4:
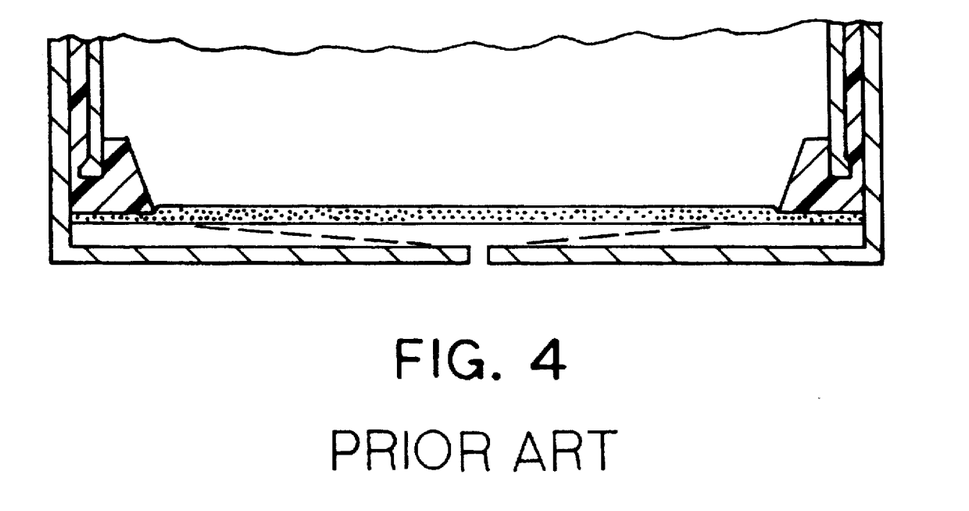
FIG. 4 is a partial section view of a prior art cell outlining a typical air plume in the air reservoir.

As oxygen enters the port, it spreads out over substantially the entire reaction surface 54, supplying necessary cathodic oxygen to the reaction surface. The spreading of the oxygen over the reaction surface is illustrated in prior art FIG. 4 as a pair of divergent dashed lines describing a wide-angle cone, and may resemble, in three dimensional view, a plume extending from an orifice. Note in FIG. 4, the relatively long distance between the port and the outer edges of the plume.

Figure 2:
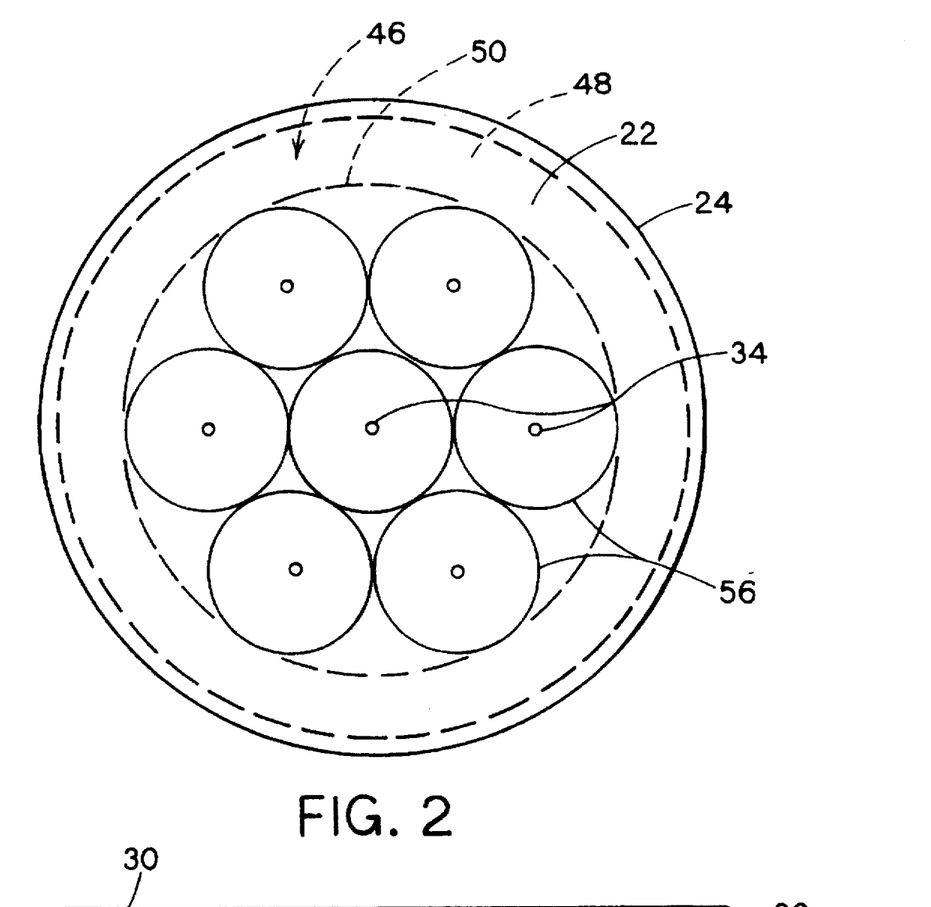
FIG. 2 is a bottom view of the cell of FIG. 1, showing a typical footprint on the cathode assembly.
Figure 3:
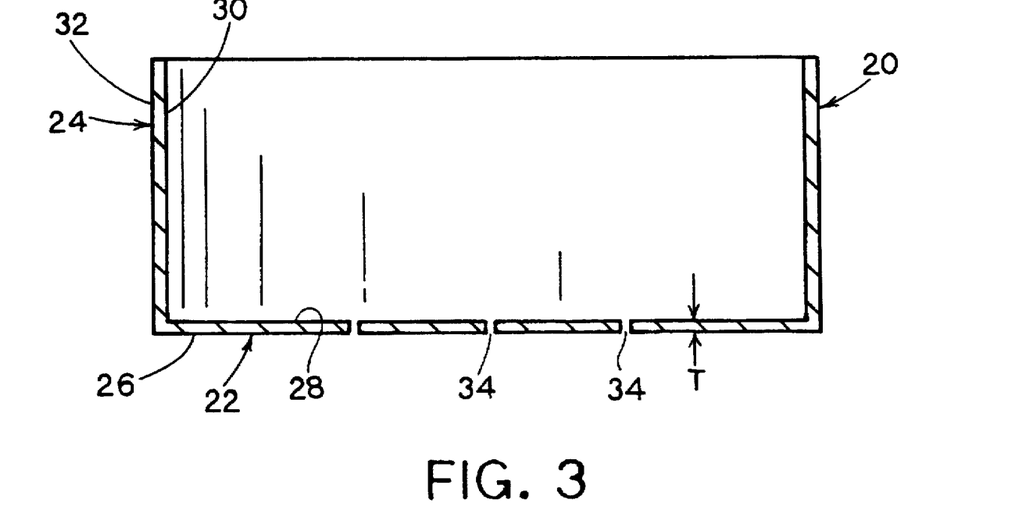
FIG. 3 is a cross-section of the cathode can of FIG. 2, taken at 3—3 of FIG. 2.
Figure 5:
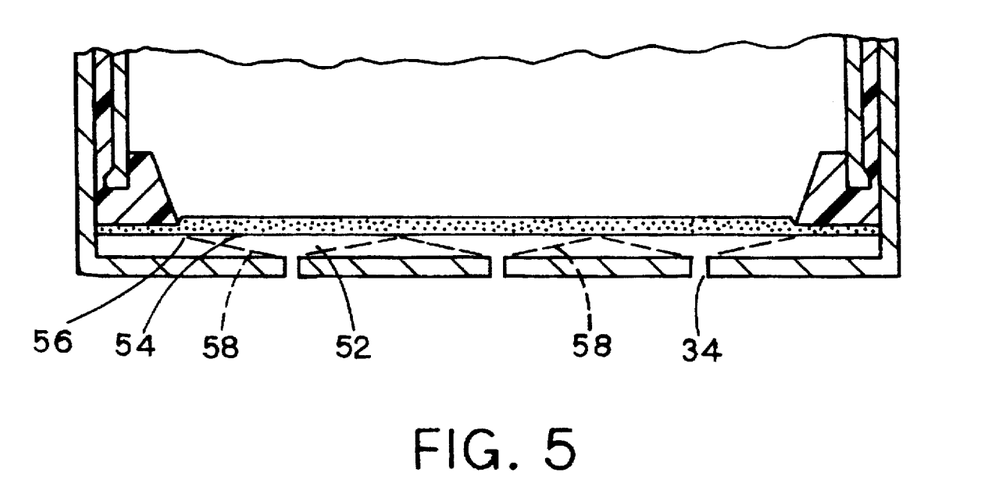
FIG. 5 is a partial section view of a cell of the invention showing typical multiple air plumes in the air reservoir.

FIGS. 2 and 5, in combination, illustrate the relatively shorter distance between each of the multiple ports 34 and the outer edge of the respective plume. Each of the 7 larger circles in the central portion of FIG. 2 represents the outer edge of the imaginary enclosed area 56 of a corresponding plume 58 or wide angle conical region at the intersection of the plume with the reaction surface of the cathode assembly. The circles are, of course, imaginary and are not visible on the reaction surface 54. They are instructive, however, regarding the distribution of oxygen in the air reservoir 52.

The arrangement of the ports 34 relative to each other is a simple study of close packing of circles inside a confining perimeter, to make a closely packed arrangement e.g. a footprint on the reaction surface. The oxygen, of course, diffuses throughout the air reservoir, to reach all areas of the entire reaction surface. However, the diffusion is most efficient within the imaginary circular outlines of the plumes 58 projected from the respective ports 34.

The PTFE air diffusion layer is generally in surface-to-surface contact with the inner surface 28 of the bottom of the cathode can, filling the air reservoir 52 which is disposed between the inner surface 28 of the cathode can and the reaction surface. The air diffusion layer is not shown in order to avoid unnecessary complexity in the illustrations. Those skilled in the art are well versed in such layers, and thus can well apply them as needed.

The air reservoir 52 serves as an accumulation chamber, holding enough oxygen "fuel" to provide for a temporary increase in the current-producing capability of the cell, sometimes also referred to as the "pulse" capability of the cell. Air reservoir 52 also serves as a damping chamber to damp out any variation in the rate at which oxygen enters the air reservoir.

It is known that there are both positive and negative aspects to exposing the reaction surface of the cathode assembly to ambient air. First, a positive aspect of exposing the reaction surface to ambient air is that such exposure is critical to the operation of the cell, in that the air provides the reacting cathodic oxygen which is required for normal and intended operation of the cell. Second, and a negative aspect of exposing the reaction surface to ambient air, is that the moisture in the electrolyte at the reaction surface can evaporate from the reaction surface, resulting in moisture loss to the cell. Third, in high humidity conditions, excess moisture can collect on the reaction surface, correspondingly undesirably diluting the composition of the electrolyte at the reaction surface.

It is well known that, for oxygen to react at the reaction surface of the cathode assembly, the reaction surface must be wetted by the cell electrolyte. The cell electrolyte is typically a combination of potassium hydroxide, water, and other additives well known in the art. In accord with such an electrolyte, the water exerts a partial vapor pressure based on the amount of water in the electrolyte, and on its interactions with the other components of the electrolyte.

In a typical such electrolyte based on potassium hydroxide, the partial vapor pressure of the water in the electrolyte equates to a relative humidity of more or less 58%. Thus, in such a cell, a steady state condition of 58% relative humidity in the air reservoir 52 would result in no net evaporation of water from the reaction surface. This can represent an ideal operating environment for the cell. To the extent the relative humidity outside the cell is less than 58%, moisture tends to evaporate from the reaction surface, and migrate out of the cell, such that the cell tends to dry out. If enough moisture is lost in this manner, the cell may cease to operate before the reaction materials are all used up, because of inadequate moisture in the cell to support normal cell operation.

To the extent the relative humidity outside the cell is greater than 58%, excess moisture tends to accumulate on the reaction surface, and correspondingly to migrate into the cell. This additional moisture on the reaction surface has the affect of diluting the concentration of potassium hydroxide at the reaction surface, whereby the electrolyte concentration at the reaction surface becomes inadequate to support normal operation of the cell. In this situation, too, the cell may prematurely cease to operate properly.

It is well known that relative humidity in ambient air varies significantly from place to place. It is also well known that relative humidity at any given place can change rapidly. Thus, electrochemical cells such as the class of metal-air cells addressed by the invention, are exposed to an often-changing condition of ambient relative humidity. This, correspondingly, subjects the cell to an often-changing relative humidity gradient between the air reservoir 52 and the ambient outside air. Movement of moisture into, or out of, air reservoir 52 depends on Knudsen Diffusion which, being dependent on Brownian movement, is proportional to the total of the cross-sectional areas of the ports. Movement of oxygen into the cell, on the other hand, is also driven by Fick's law of diffusion which addresses the depleted oxygen partial pressure at the reaction surface.

To the extent the open cross-sectional area of the ports is large, relative humidity equilibrium between ambient air and the air reservoir is reached rather quickly, such that 95% of an initial relative humidity differential may be eliminated in a few days, whereby the relative humidity inside the cell approaches ambient relative humidity; never the reverse. To the extent the cross-sectional area of the ports 34 is less, it takes longer to reach relative humidity equilibrium.

The longer time for reaching relative humidity equilibrium, whereby the relative humidity inside the cell is maintained generally closer to ideal conditions for a relatively longer period of time, results in improved cell performance over that longer period of time.

In general, the rate at which air can enter the air reservoir through the port, and the rate at which moisture vapor and oxygen-depleted air can exit the air reservoir through the port, depends on the configuration and arrangement of the port or ports. Known cells have one or more such ports. However, the art is deficient in teaching the relationship between ingress of oxygen laden air, exhausting of oxygen depleted air, and traverse of moisture vapor through the port into and out of the air reservoir 52.

In general, a port 34 extends through the bottom 22 of the cathode can, providing a route of access for air to travel from outside the cathode can to the air reservoir 52 on the inside of the cathode can. Preferably, a port 34 is generally round in shape, such that it has a diameter extending thereacross. Thus, each port defines an included cross-sectional area, such that one can measure the diameter of each port, calculate the area of the opening corresponding to e.g. the outer surface 26 of the cathode can for each port, and thus arrive at a composite sum of the area represented by all of the ports 34.

By studying phenomena related to gaseous transport of oxygen and air, gaseous transport of moisture vapor, and the properties of corresponding metal-air cells, the inventors herein have discovered that, for a given cell size and structure, the amount of moisture lost from the cell, relative to the amount of electricity produced, can be reduced by using a plurality of spaced smaller holes in place of the conventionally used larger holes. In addition, the inventors have surprisingly discovered that, considering known electrical performance characteristics for a given cell, and considering a standard port configuration, cell electrical performance characteristics can be maintained while the weight loss performance characteristics can be maintained while the weight loss due to moisture evaporation is reduced, by increasing the number of ports while reducing the composite sum of the area represented by all of the ports.

EXAMPLE 1

Two cells were constructed according to size PR44 of the international Electrochemical Commission (IEC). The first cell was constructed having three ports 34, each 0.018 inch diameter, for a total area of 0.5 millimeter squared represented by all the ports. A second, otherwise identical cell was constructed having 6 ports 34, each 0.010 inch diameter, for a 40% smaller total area of 0.3 millimeter squared represented by all the ports. The limiting current of the first cell, with the 3 larger ports, was 39.0 milliamps; that of the second cell, with the 6 smaller ports, was 38.2 milliamps. Standard deviation was 3 milliamps, whereby the limiting currents of the two cells were statistically indistinguishable from each other.

Both cells were subjected to identical conditions of 2% relative humidity for 14 days. Weight loss of the first cell was 26.8 milligrams, while that of the second cell was only 23.8 milligrams. Thus, by dividing up the port area into 6 ports instead of 3 ports, and correspondingly reducing the overall total area represented by the ports, the current capability of the cell was maintained while the moisture loss was reduced by 11%.

Figure 6:
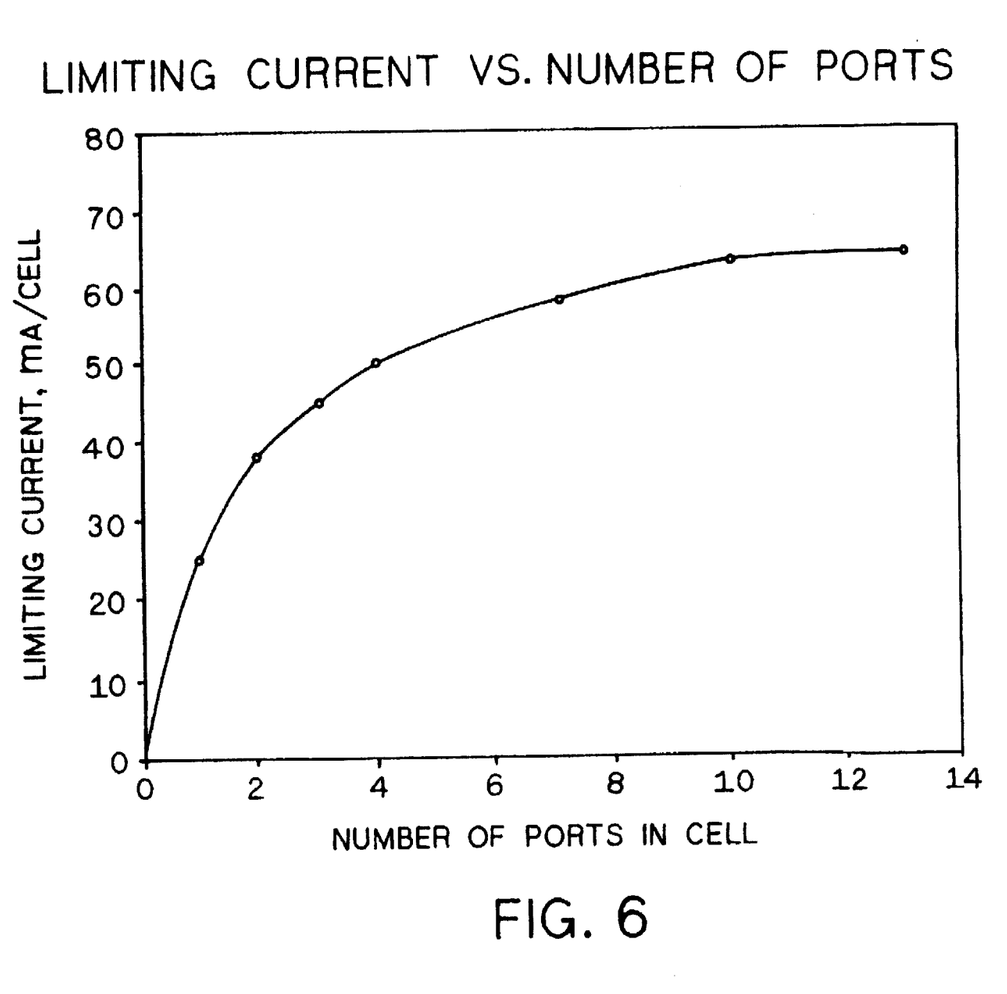
FIG. 6 is a graph showing the relationship between limiting current of a metal-air cell and the number of air entry ports in the bottom of the cathode can, while holding constant the combined area of all the ports.
Figure 7:
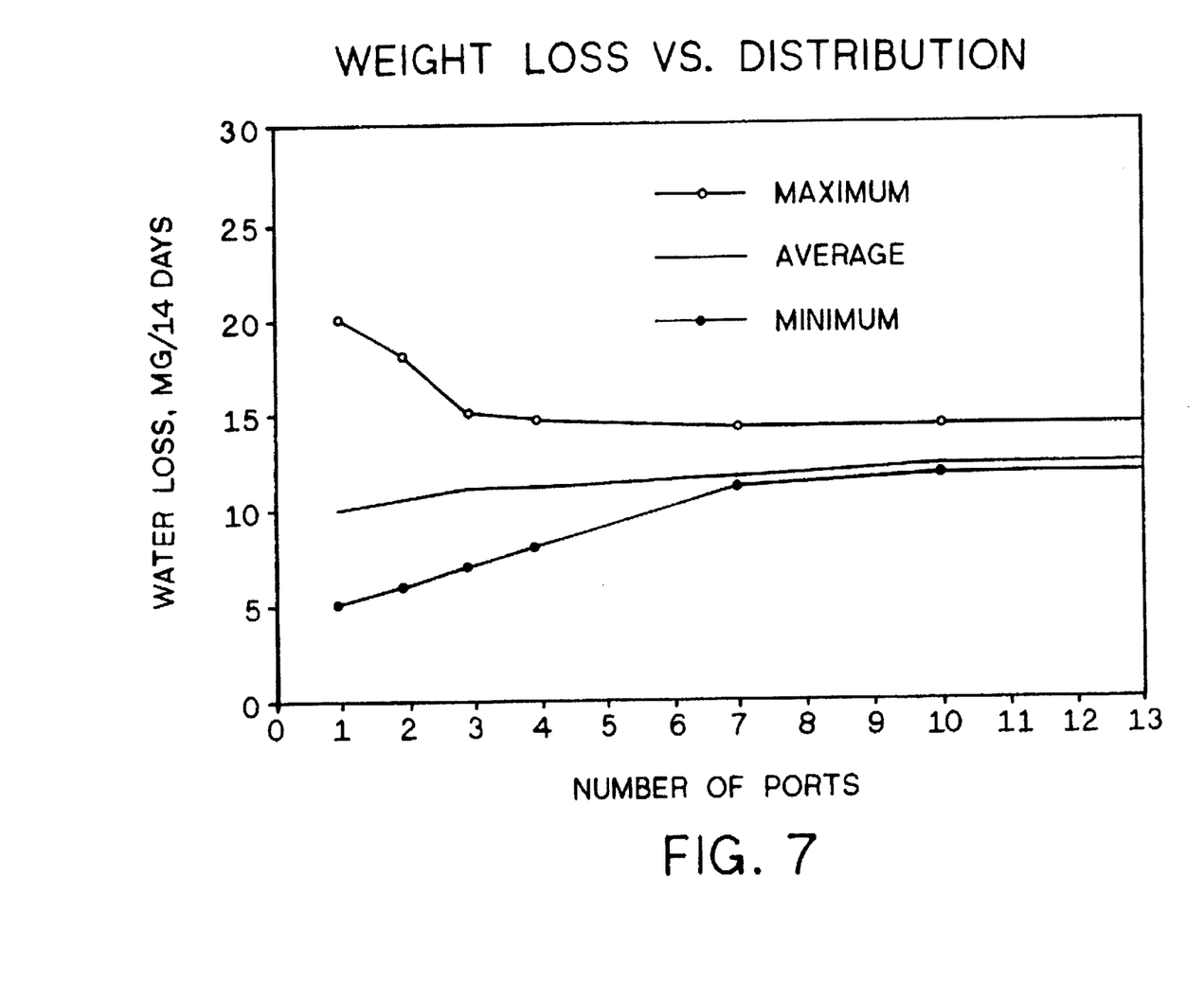
FIG. 7 is a graph showing weight loss of the cells referred to in FIG. 6.

FIG. 6 shows in general the relationship between the number of ports and limiting current of the cell. As seen in FIG. 6, as the number of ports is increased, while maintaining constant the total area represented by the ports 34, the limiting current of the cell rises, from a low of about 24 milliamps with a single port, to a high of about 60 milliamps with 13 ports. FIG. 7 shows corresponding representation of the weight loss of the cells in the 14 day weight loss test, showing that weight loss remained relatively constant while limiting current increased over 100% from 24 milliamps to 60 milliamps.

The cells used to generate the data represented in FIGS. 6 and 7 were zinc air cells, such as those illustrated in FIG. 1. Outside diameter of each cell was 0.610 inch. The diameter of the reaction surface of the cathode assembly was 0.500 inch. The corresponding area of the reaction surface was 1.27 centimeters squared. Total area of the ports was, in all cases, 0.0593 millimeter squared. Cells were made having from 1 port to 13 ports. But the total area for all the ports in any one cell was the same 0.0593 millimeter squared. Thus, as the number of ports was increased, the sizes of the corresponding ports was smaller. The ports were distributed over the surfaces of the bottoms of the respective cathode cans, evenly about the area described on each can inside the inner edge 50 of the grommet 48 of the respective seal 16.

The number of ports, and the diameters of the respective ports are shown in the following Table 1.

TABLE 1

| Number of Ports | Diameter Inches |
|---|---|
| 1 | .0108 |
| 2 | .0076 |
| 3 | .0062 |
| 4 | .0054 |
| 7 | .0041 |
| 10 | .0034 |
| 13 | .0030 |

Thus, FIGS. 6 and 7 illustrate the principle that distributing the area of the opening provided by the ports, over an increasing number of ports, results in an increased capacity, measurable at least in terms of the limiting current of the cell. FIG. 7 illustrates the general principle that the moisture loss is not correspondingly increased. Rather, moisture loss remains relatively constant.

Figure 8:
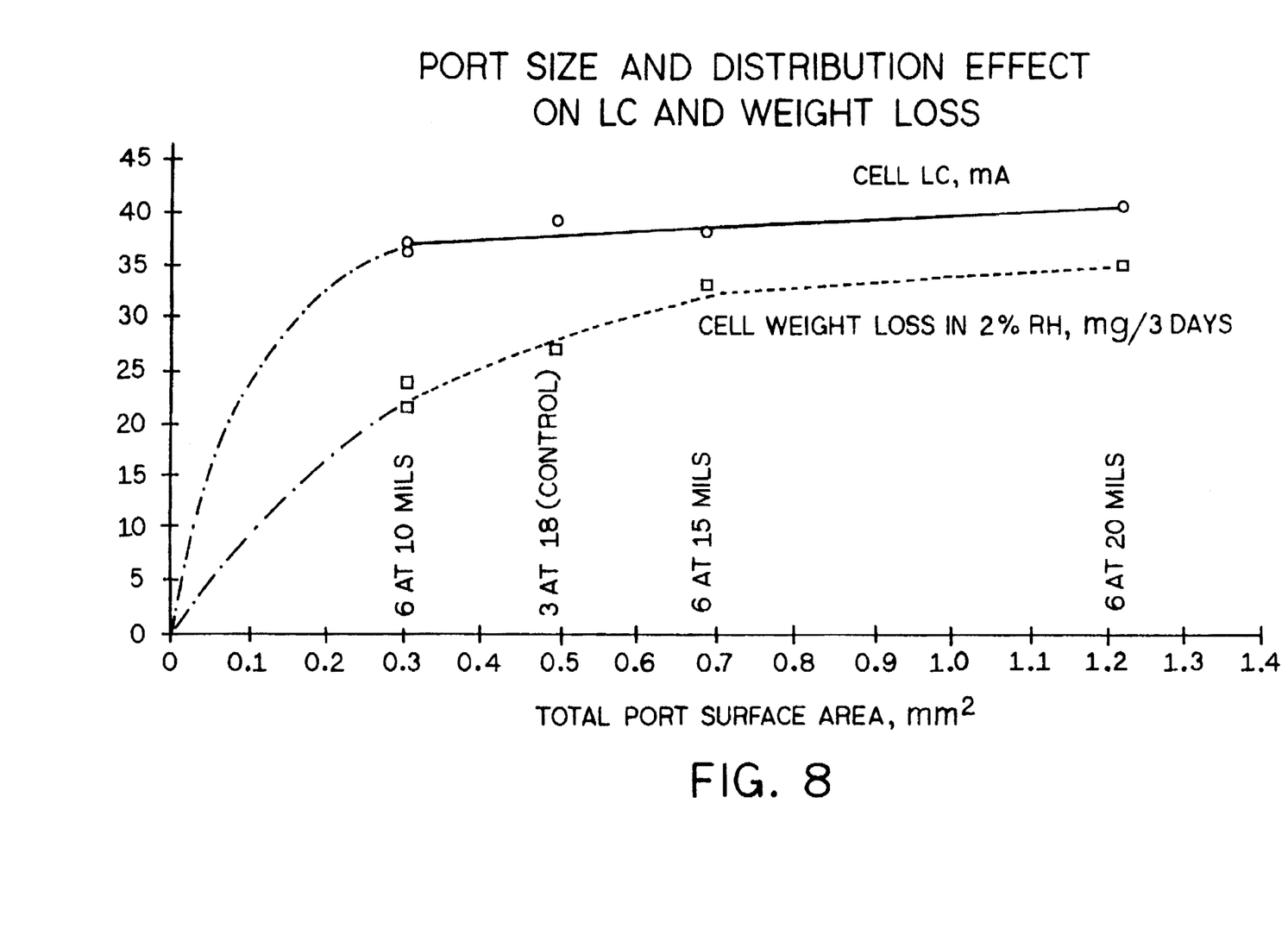
FIG. 8 is a graph illustrating both the limiting current and the cell weight loss as a function of the total open surface area of the ports, and related to the number of ports.

FIG. 8 further illustrates the negative affect of making the ports 34 larger than necessary. The cells used were size PR44, according to standards of the IEC. A preferred cell of the invention having 6 ports, each 0.010 inch diameter, is represented in FIG. 8 as having total area of its ports of 0.3 millimeter squared. Two other data points are shown, at approximately 0.7 and 1.2 total area, having the same number of ports (6), but wherein the ports are larger at 0.015 and 0.020 inch diameter. A standard cell, not of the invention, having 3 ports, 0.018 inch diameter is also shown as a control at approximately area 0.5.

FIG. 8 illustrates at least three points. First, FIG. 8 illustrates that the limiting current of the cell can be maintained while reducing the combined area of the ports, by increasing the number of ports, while at the same time reducing moisture loss. Second, it shows that maintaining the number of ports, and increasing the size of the ports does not necessarily result in an increase in limiting current. Third, FIG. 8 illustrates the converging relationship between limiting current and moisture loss as the total surface area of the ports is increased, and the corresponding divergence of limiting current and moisture loss as total surface area of the ports is decreased.

Note in FIG. 8 that the combination dashed/dotted lines representing total port surface area less than 0.3 millimeter squared show only theoretical representations linking the actual data at 0.3 to the fact that the limiting current and the weight loss due to evaporation both approach zero as total port surface area approaches zero.

Tables 2, 3, and 4 show data for cells of the invention which are Examples 2, 12, and 24, compared to conventionally known cells, not of the invention, namely Examples 3c–11c, 13c–23c, and 25c–32c. Each of Tables 2–4 represents a separate cell size. Each of the examples of conventional cells, in each table, represents a different manufacturer of cells commercially available, the samples being secured generally within 18 months of submission of the application herein. Descriptions for abbreviations in all three tables are given at the end of Table 4.

TABLE 2

Size = PR44.  Active Area, A = .701 cm². Cell OD = .453 inch

| Ex. No. | No. Ports | Port Dia. Inch | Port Area mm² | LC mA | LC/A | Dp/Dc | AP/Ac |
|---|---|---|---|---|---|---|---|
| 2 | 6 | .00973 | .288 | 37.7 | 131 | 21.5 | .068 |
| 3c | 3 | .0184 | .513 | 32.0 | 62.4 | 40.5 | .244 |
| 4c | 4 | .0196 | .781 | 41.1 | 52.7 | 43.3 | .278 |
| 5c | 2 | .0158 | .251 | 24.6 | 97.9 | 34.8 | .179 |
| 6c | 2 | .0199 | .399 | 23.7 | 59.4 | 43.8 | .285 |
| 7c | 3 | .0230 | .802 | 34.1 | 42.5 | 50.7 | .381 |
| 8c | 2 | .0175 | .309 | 19.2 | 62.2 | 38.5 | .220 |
| 9c | 2 | .0170 | .293 | 12.0 | 41.0 | 37.5 | .209 |
| 10c | 2 | .0147 | .218 | 15.7 | 72.2 | 32.3 | .155 |
| 11c | 2 | .0169 | .289 | 13.8 | 47.7 | 37.3 | .206 |

TABLE 3

Size = PR48.  Active Area A = .289 cm². Cell OD = .305 inch

| Ex. No. | No. Ports | Port Dia. Inch | Port Area mm² | LC mA | LC/A | Dp/Dc | AP/Ac |
|---|---|---|---|---|---|---|---|
| 12 | 4 | .0050 | .051 | 9.0 | 177 | 16.4 | .044 |
| 13c | 2 | .0186 | .351 | 15.0 | 42.8 | 61.0 | .607 |
| 14c | 2 | .0181 | .332 | 13.8 | 41.6 | 59.3 | .574 |
| 15c | 2 | .0173 | .303 | 16.5 | 54.4 | 56.7 | .525 |
| 16c | 2 | .0176 | .314 | 16.3 | 51.9 | 57.7 | .543 |
| 17c | 1 | .0178 | .161 | 6.0 | 37.4 | 58.4 | .556 |
| 18c | 2 | .0196 | .389 | 13.9 | 35.7 | 64.3 | .674 |
| 19c | 1 | .0185 | .173 | 9.7 | 55.9 | 60.7 | .600 |
| 20c | 1 | .0187 | .177 | 10.4 | 58.7 | 61.3 | .613 |
| 21c | 1 | .0158 | .126 | 7.5 | 59.3 | 51.8 | .438 |
| 22c | 1 | .0187 | .177 | 7.4 | 41.8 | 61.3 | .613 |
| 23c | 1 | .0131 | .087 | 6.0 | 69.0 | 43.0 | .301 |

TABLE 4

Size = PR41. Active Area A = .288 cm². Cell OD = .304 inch

| Ex. No. | No. Ports | Port Dia. Inch | Port Area mm² | LC mA | LC/A | Dp/Dc | AP/Ac |
|---|---|---|---|---|---|---|---|
| 24  | 3 | .0050 | .038 | 9.8  | 257  | 16.4 | .044 |
| 25c | 1 | .0106 | .057 | 10.6 | 151  | 34.9 | .198 |
| 26c | 2 | .0101 | .103 | 8.6  | 83.2 | 33.2 | .179 |
| 27c | 1 | .0208 | .219 | 12.1 | 55.2 | 68.4 | .761 |
| 28c | 1 | .0193 | .189 | 12.6 | 66.8 | 63.5 | .655 |
| 29c | 1 | .0178 | .161 | 6.9  | 43.0 | 58.6 | .557 |
| 30c | 1 | .0083 | .035 | 7.0  | 200  | 27.3 | .121 |
| 31c | 1 | .0172 | .150 | 6.4  | 42.7 | 56.6 | .521 |
| 32c | 1 | .0176 | .157 | 7.0  | 44.6 | 57.9 | .545 |

LC = Limiting Current.
Dp = Diameter of the ports.
Dc = Outside Diameter of the cell, measured on the cathode can.
Ap = Area of one port.
Ac = Area of the cathode can, based on Dc.

Tables 2–4 demonstrate that the cells of the invention are superior to conventional cells, in terms of the ratio of the limiting current to total area of the ports. Within each cell size, the cells of the invention have the smallest ratio of diameter of each port to diameter of the cell. They also have the smallest ratio of area of one port to area of the bottom of the cell. By limiting the relative diameter of the ports, and thus the relative areas of the ports, the moisture loss is correspondingly limited. In all except Table 4, the cells of the invention have the smallest total area of all the ports in a single cell. See Comparative Example 30 for a cell which has a comparable total area of 0.035 mm² with one port, compared with the cell of the invention (Ex.24) which has an area of 0.038 mm², but wherein the cell of the invention, with 3 ports, has a limiting current 28% greater than the conventional cell of Comparative Example 30. Thus, the comparison of Example 24 with Comparative Example 30 further illustrates that distributing a given port area over a multiplicity of ports can result in an increase in limiting current.

Examples 2, 12, and 24 suggest that the preferred port diameter depends in part on the absolute size of the imaginary closed area 56 represented by the intersection of the plume 58 with the reaction surface 54. Assuming each port supports an equal proportion of the reaction surface, each port in Example 2 supports 0.711/6=0.119 cm² of the reaction surface while each port in Examples 12 and 24 supports 0.072 cm² and 0.096 cm² respectively. Thus, in general, the smaller the area of the reaction surface to be supported by each port, the smaller the port size can be.

Following the empirical data of e.g. FIG. 6 to its logical conclusion, the ideal port configuration comprises an infinitely large number of ports evenly distributed on the bottom 22, adjacent reaction surface 54, each port being infinitesimally small in size.

However, from a practical standpoint, the actual number of ports will always be finite, and will be governed at least in part by the incremental increase in cell productivity to be achieved by adding one more port. Again referring to FIG. 6, it is clear that the incremental increase in limiting current that results from an incremental increase in the number of ports follows a pattern of diminishing returns as the number of ports is increased. Thus, for the cell represented in FIG. 6, no substantial benefit would be obtained from using more than 10 ports, and even less may be preferred when the incremental cost of making more and smaller ports is considered.

The specific number of ports, and the specific size of the ports, will of course, depend on the size of the cell (reaction surface) and the performance characteristics demanded of the cell. However, for substantially every standard size metal-air cell, the ratio of limiting current to moisture loss can be increased by distributing the port area over at least two ports, and correspondingly reducing the total port area.

Port size has been discussed herein with respect to diameter, implying a circular port opening, which is preferred. However, any shape opening can be used, such as square, elliptical, etc. While some modest adaptation of the invention would be suggested, the same principles apply to such divergent shapes.

In general, ports in the cathode cans, and corresponding cells, of the invention range in size from about 0.001 inch diameter to about 0.017 inch. However, any reduction in port area from conventionally used port configurations, when coupled with dividing that area over a greater number of ports, can result in increased limiting current while maintaining constant the moisture loss. Correspondingly, moisture loss may be reduced by dividing the port area over a greater number of ports, and reducing the total port area enough that the limiting current is maintained constant. The net result is less total port area, which results in less moisture loss.

Accordingly, if only one port is used, benefit is obtained to the extent port diameter is no more than 0.0067 inch. If two ports are used, benefit is obtained so long as the port diameter is no more than 0.010 inch. Where three or more ports are used, benefit is obtained so long as the port diameter is no more than 0.017 inch. As suggested by Examples 2, 12, and 24, preferred port diameters typically range from about 0.005 inch to about 0.010 inch.

Cathode cans 20 of the invention can be made using a variety of metal structures. Plating materials and ductility are the important characteristics of the cathode can. The can may be formed of virtually any metal that is plated or clad with the appropriate metal, such appropriate metal having a hydrogen overvoltage similar to that of the corresponding electrode and being insoluble at high pH's (or in the presence of electrolyte), the metal plating or cladding being in chemical communication via the electrolyte with the electrode material, if not in direct physical contact therewith.

Optionally, the can 20 may be formed entirely of a metal or alloy having a hydrogen overvoltage similar to that of the electrode (as opposed to plating or cladding the can). In addition to nickel, stainless steel, palladium, silver, platinum, and gold may be suitable plating, cladding, or can materials. Steel strip plated with nickel and nickel alloy is generally used because the cost is low, and because pre-plated steel strip, which generally requires no post-plating processes, is commercially available. The metal in the can must be ductile enough to withstand the drawing process, and strong enough to withstand the cell crimping and closure process.

Cathode cans, for example, may be made of cold-rolled steel plated with nickel. Steel strip pre-plated with nickel can also be used. Cathode cans may also be formed from cold-rolled mild steel, with at least the inside portions of the cans being subsequently post plated with nickel. Other specific examples of materials for cathode cans include nickel-clad stainless steel; nickel-plated stainless steel; INCONEL (INCO alloy of nickel, a non-magnetic alloy); pure nickel with minor alloying elements (NICKEL 200 and related family of NICKEL 200 alloys such as NICKEL 201, etc.), all available from Huntington Alloys, a division of INCO, Huntington, W.Va. Some noble metals may also find use as plating, cladding, or can metals, including steel strip plated with nickel, and mild steel strip subsequently plated with nickel after forming the can.

Cathode cans of the invention can be made using sheet material which is the conventional 0.008 inch to 0.012 inch thick. Preferred sheet material thickness is less, for example about 0.0065 inch. In any event, where the smaller ports are used, e.g. 0.005 inch diameter, the diameter of a given port can be less than the thickness of the sheet material in which it is made. For example, where metal thickness is 0.0065 inch and port diameter is 0.005 inch, the port diameter is only 77% as large as the metal thickness.

The reduced size ports of the invention can be made using a variety of known processes such as impact punch, punch and peen, water jet focused through sapphire, laser piercing, and the like.

Those skilled in the art can select the desired process based on their own preferences and skills, and economic aspects of practicing the respective processes.

Those skilled in the art will now see that certain modifications can be made to the apparatus and methods herein disclosed with respect to the illustrated embodiments, without departing from the spirit of the instant invention. And while the invention has been described above with respect to the preferred embodiments, it will be understood that the invention is adapted to numerous rearrangements, modifications, and alterations, and all such arrangements, modifications, and alterations are intended to be within the scope of the appended claims.

Having thus described the invention, what is claimed is:

1. Electrochemical cell apparatus, comprising:
   (a) a cathode can, comprising (i) a bottom, said bottom having an inner surface, an outer surface, and a thickness between said inner and outer surfaces, and at least two ports extending therethrough, between said inner surface and said outer surface, and (ii) a side wall extending upwardly from said bottom, said ports having open areas corresponding to diameters smaller than the thickness of said bottom and between 0.002 inch up to about 0.010 inch; and
   (b) a cathode assembly in said cathode can, said cathode assembly being spaced from said bottom and having a reaction surface facing said bottom, and thereby defining a reservoir between said bottom and said cathode assembly, said reaction surface of said cathode assembly defining an effective reaction area, gas entering said reservoir through said ports and traversing across said reservoir to said reaction surface expanding from each said port during such traverse, respective wide angle conical regions corresponding to said respective ports, the wide angle conical regions being represented, at said reaction surface, by outlines of respective imaginary closed figures on said reaction surface aligned with respective said ports, the imaginary closed figures, when sized to touch each other, but generally not overlap each other, representing a footprint on said cathode assembly corresponding with the spacing of said ports on said bottom, the spacing of said ports being such that the footprint covers at least 80% of the effective reaction area of said reaction surface of said cathode assembly.

2. Electrochemical cell apparatus as in claim 1, said bottom having at least 3 ports extending therethrough.

3. Electrochemical cell apparatus as in claim 1, said bottom having at least 5 ports extending therethrough.

4. Electrochemical cell apparatus as in claim 1, said bottom having at least 6 ports extending therethrough.

5. Electrochemical cell apparatus as in claim 1, said bottom having at least 7 ports extending therethrough.

6. An electrochemical cell made with electrochemical cell apparatus as in claim 1, said electrochemical cell further comprising an anode including an anode can, a separator between said anode and said cathode, and an electrolyte, said electrolyte having a steady state relative humidity at said reaction surface, and wherein, given a relative humidity outside said cell differing from the steady state relative humidity at said reaction surface of said cathode assembly by at least 30 relative humidity percent, the time required to reduce the difference in relative humidity by 95% is greater than 30 days.

7. Electrochemical cell apparatus as in claim 1, said ports being substantially evenly spaced from each other.

8. Electrochemical cell apparatus as in claim 2, said ports being substantially evenly spaced from each other.

9. Electrochemical cell apparatus as in claim 3, said ports being substantially evenly spaced from each other.

10. Electrochemical cell apparatus as in claim 4, said ports being substantially evenly spaced from each other.

11. Electrochemical cell apparatus as in claim 5, said ports being substantially evenly spaced from each other.

12. Electrochemical cell apparatus as in claim 1, the effective diameters of said at least two ports being between 0.002 inch and about 0.008 inch.

13. Electrochemical cell apparatus as in claim 3, the effective diameters of said at least two ports being between 0.002 inch and about 0.008 inch.

14. Electrochemical cell apparatus as in claim 4, the effective diameters of said at least two ports being between 0.002 inch and about 0.008 inch.

15. Electrochemical cell apparatus as in claim 5, the effective diameters of said at least two ports being between 0.002 inch and about 0.008 inch.

16. Electrochemical cell apparatus as in claim 1, the effective diameters of said at least two ports being about 0.003 inch to about 0.005 inch.

17. Electrochemical cell apparatus as in claim 3, the effective diameters of said at least two ports being about 0.003 inch to about 0.005 inch.

18. Electrochemical cell apparatus as in claim 4, the effective diameters of said at least two ports being about 0.003 inch to about 0.005 inch.

19. Electrochemical cell apparatus as in claim 5, the effective diameters of said at least two ports being about 0.003 inch to about 0.005 inch.

20. An electrochemical cell made with electrochemical cell apparatus of claim 1.

21. An electrochemical cell made with electrochemical cell apparatus of claim 2.

22. An electrochemical cell made with electrochemical cell apparatus of claim 3.

23. An electrochemical cell made with electrochemical cell apparatus of claim 4.

24. An electrochemical cell made with electrochemical cell apparatus of claim 5.

25. An electrochemical cell made with electrochemical cell apparatus of claim 12.

26. An electrochemical cell made with electrochemical cell apparatus of claim 13.

27. An electrochemical cell made with electrochemical cell apparatus of claim 14.

28. An electrochemical cell made with electrochemical cell apparatus of claim 15.

29. An electrochemical cell made with electrochemical cell apparatus of claim 16.

30. An electrochemical cell made with electrochemical cell apparatus of claim 17.

31. An electrochemical cell made with electrochemical cell apparatus of claim 18.

32. An electrochemical cell made with electrochemical cell apparatus of claim 19.

33. An electrochemical cell, comprising:
   (a) an anode, including an anode can;
   (b) a cathode, including a cathode can, and a cathode assembly in said cathode can, said cathode can comprising a bottom, said bottom having an inner surface, an outer surface, and a thickness between said inner surface and said outer surface, and at least one port extending therethrough, between said inner surface and said outer surface, said at least one port having an open area corresponding to a diameter smaller than the thickness of said bottom, said cathode assembly having a reaction surface facing said bottom, said reaction surface defining an effective reaction area thereon;
   (c) a separator between said anode and said cathode; and
   (d) electrolyte;
the ratio of the limiting current of said electrochemical cell in milliamps, to the effective reaction area of said reaction surface in millimeters squared being at least 100/1.

34. An electrochemical cell as in claim 33, the ratio of the limiting current of said electrochemical cell in milliamps, to the effective reaction area of said reaction surface in millimeters squared being at least 125/1.

35. An electrochemical cell as in claim 33, the ratio of the limiting current of said electrochemical cell in milliamps, to the effective reaction area of said reaction surface in millimeters squared being at least 150/1.

36. An electrochemical cell as in claim 33, the ratio of the limiting current of said electrochemical cell in millimeters, to the effective reaction area of said reaction surface in millimeters squared being at least 220/1.

37. An electrochemical cell as in claim 33, said at least one port defining an open area corresponding to an effective diameter of said port, the effective diameter of said port being less than 0.010 inch.

38. An electrochemical cell as in claim 33, said at least one port defining an open area corresponding to an effective diameter of said port, the effective diameter of said port being less than 0.008 inch.

39. An electrochemical cell as in claim 33, said at least one port defining an open area corresponding to an effective diameter of said port, the effective diameter of said port being less than 0.0065 inch.

40. An electrochemical cell as in claim 33, said at least one port defining an open area corresponding to an effective diameter of said port, the effective diameter of said port being less than 0.005 inch.

41. An electrochemical cell as in claim 33, said at least one port defining an open area corresponding to an effective diameter of said port, the effective diameter of said port being less than 0.003 inch.

42. An electrochemical cell as in claim 33, said electrolyte having a steady state relative humidity at said reaction surface, and wherein, given a relative humidity outside said cell differing from the steady state relative humidity at said reaction surface of said cathode assembly by at least 30 relative humidity percent, the time required to reduce the difference in relative humidity by 95% is greater than 30 days.

43. An electrochemical cell as in claim 34, said electrolyte having a steady state relative humidity at said reaction surface, and wherein, given a relative humidity outside said cell differing from the steady state relative humidity at said reaction surface of said cathode assembly by at least 30 relative humidity percent, the time required to reduce the difference in relative humidity by 95% is greater than 30 days.

44. An electrochemical cell as in claim 35, said electrolyte having a steady state relative humidity at said reaction surface, and wherein, given a relative humidity outside said cell differing from the steady state relative humidity at said reaction surface of said cathode assembly by at least 30 relative humidity percent, the time required to reduce the difference in relative humidity by 95% is greater that 30 days.

45. An electrochemical cell as in claim 36, said electrolyte having a steady state relative humidity at said reaction surface, and wherein, given a relative humidity outside said cell differing from the steady state relative humidity at said reaction surface of said cathode assembly by at least 30 relative humidity percent, the time required to reduce the difference in relative humidity by 95% is greater than 30 days.

46. An electrochemical cell as in claim 37, said electrolyte having a steady state relative humidity at said reaction surface, and wherein, given a relative humidity outside said cell differing from the steady state relative humidity at said reaction surface of said cathode assembly by at least 30 relative humidity percent, the time required to reduce the difference in relative humidity by 95% is greater than 30 days.

47. An electrochemical cell as in claim 38, said electrolyte having a steady state relative humidity at said reaction surface, and wherein, given a relative humidity outside said cell differing from the steady state relative humidity at said reaction surface of said cathode assembly by at least 30 relative humidity percent, the time required to reduce the difference in relative humidity by 95% is greater than 30 days.

48. An electrochemical cell as in claim 39, said electrolyte having a steady state relative humidity at said reaction surface, and wherein, given a relative humidity outside said cell differing from the steady state relative humidity at said reaction surface of said cathode assembly by at least 30 relative humidity percent, the time required to reduce the difference in relative humidity by 95% is greater than 30 days.

49. An electrochemical cell as in claim 40, said electrolyte having a steady state relative humidity at said reaction surface, and wherein, given a relative humidity outside said cell differing from the steady state relative humidity at said reaction surface of said cathode assembly by at least 30 relative humidity percent, the time required to reduce the difference in relative humidity by 95% is greater than 30 days.

50. An electrochemical cell as in claim 41, said electrolyte having a steady state relative humidity at said reaction surface, and wherein, given a relative humidity outside said cell differing from the steady state relative humidity at said reaction surface of said cathode assembly by at least 30 relative humidity percent, the time required to reduce the difference in relative humidity by 95% is greater than 30 days.

51. Electrochemical cell apparatus as in claim 33, said at least one port defining an open area corresponding to an effective diameter of between 0.002 inch and about 0.008 inch.

52. Electrochemical cell apparatus as in claim 33, said at least one port defining an open area corresponding to an effective diameter of about 0.003 inch to about 0.005 inch.

53. Electrochemical cell apparatus as in claim 33, including at least two ports extending through said bottom of said cathode can, said cathode assembly being spaced from said bottom, thereby defining a reservoir between said bottom and said cathode assembly, gas entering said reservoir through said at least two ports and traversing across said reservoir to said reaction surface expanding from each of said at least two ports during such traverse, respective wide angle conical regions corresponding to respective said ports, the wide angle conical regions being represented at said reaction surface, by outlines of respective imaginary closed figures on said reaction surface aligned with respective said ports, the imaginary closed figures, when sized to touch each other, but generally not overlap each other, representing a footprint on said cathode assembly corresponding with spacing of said ports on said bottom, the spacing of said ports being such that the footprint covers at least 80% of the effective reaction area of said reaction surface of said cathode assembly.

54. Electrochemical cell apparatus as in claim 37, including at least two ports extending through said bottom of said cathode can, said cathode assembly being spaced from said bottom, thereby defining a reservoir between said bottom and said cathode assembly, gas entering said reservoir through said at least two ports and traversing across said reservoir to said reaction surface expanding from each of said at least two ports during such traverse, respective wide angle conical regions corresponding to respective said ports, the wide angle conical regions being represented at said reaction surface, by outlines of respective imaginary closed figures on said reaction surface aligned with respective said ports, the imaginary closed figures, when sized to touch each other, but generally not overlap each other, representing a footprint on said cathode assembly corresponding with spacing of said ports on said bottom, the spacing of said ports being such that the footprint covers at least 80% of the effective reaction area of said reaction surface of said cathode assembly.

55. Electrochemical cell apparatus as in claim 38, including at least two ports extending through said bottom of said cathode can, said cathode assembly being spaced from said bottom, thereby defining a reservoir between said bottom and said cathode assembly, gas entering said reservoir through said at least two ports and traversing across said reservoir to said reaction surface expanding from each of said at least two ports during such traverse, respective wide angle conical regions corresponding to respective said ports, the wide angle conical regions being represented at said reaction surface, by outlines of respective imaginary closed figures on said reaction surface aligned with respective said ports, the imaginary closed figures, when sized to touch each other, but generally not overlap each other, representing a footprint on said cathode assembly corresponding with spacing of said ports on said bottom, the spacing of said ports being such that the footprint covers at least 80% of the effective reaction area of said reaction surface of said cathode assembly.

56. Electrochemical cell apparatus as in claim 39, including at least two ports extending through said bottom of said cathode can, said cathode assembly being spaced from said bottom, thereby defining a reservoir between said bottom and said cathode assembly, gas entering said reservoir through said at least two ports and traversing across said reservoir to said reaction surface expanding from each of said at least two ports during such traverse, respective wide angle conical regions corresponding to respective said ports, the wide angle conical regions being represented at said reaction surface, by outlines of respective imaginary closed figures on said reaction surface aligned with respective said ports, the imaginary closed figures, when sized to touch each other, but generally not overlap each other, representing a footprint on said cathode assembly corresponding with spacing of said ports on said bottom, the spacing of said ports being such that the footprint covers at least 80% of the effective reaction area of said reaction surface of said cathode assembly.

57. Electrochemical cell apparatus as in claim 40, including at least two ports extending through said bottom of said cathode can, said cathode assembly being spaced from said bottom, thereby defining a reservoir between said bottom and said cathode assembly, gas entering said reservoir through said at least two ports and traversing across said reservoir to said reaction surface expanding from each of said at least two ports during such traverse, respective wide angle conical regions corresponding to respective said ports, the wide angle conical regions being represented at said reaction surface, by outlines of respective imaginary closed figures on said reaction surface aligned with respective said ports, the imaginary closed figures, when sized to touch each other, but generally not overlap each other, representing a footprint on said cathode assembly corresponding with spacing of said ports on said bottom, the spacing of said ports being such that the footprint covers at least 80% of the effective reaction area of said reaction surface of said cathode assembly.

58. Electrochemical cell apparatus as in claim 41, including at least two ports extending through said bottom of said cathode can, said cathode assembly being spaced from said bottom, thereby defining a reservoir between said bottom and said cathode assembly, gas entering said reservoir through said at least two ports and traversing across said reservoir to said reaction surface expanding from each of said at least two ports during such traverse, respective wide angle conical regions corresponding to respective said ports, the wide angle conical regions being represented at said reaction surface, by outlines of respective imaginary closed figures on said reaction surface aligned with respective said ports, the imaginary closed figures, when sized to touch each other, but generally not overlap each other, representing a footprint on said cathode assembly corresponding with spacing of said ports on said bottom, the spacing of said ports being such that the footprint covers at least 80% of the effective reaction area of said reaction surface of said cathode assembly.

59. An electrochemical cell as in claim 33, said bottom of said cathode can having at least three ports extending therethrough.

60. An electrochemical cell as in claim 33, said bottom of said cathode can having at least five ports extending therethrough.

61. An electrochemical cell as in claim 33, said bottom of said cathode can having at least six ports extending therethrough.

62. An electrochemical cell as in claim 33, said bottom of said cathode can having at least seven ports extending therethrough.

* * * * *